UNITED STATES PATENT OFFICE.

SANDFORD C. COX, OF EDISON PARK, ILLINOIS, ASSIGNOR TO COX MULTI-MAILER COMPANY, OF AUGUSTA, MAINE, A CORPORATION OF MAINE.

FOLDING AND WRAPPING MACHINE.

1,152,794.

Specification of Letters Patent.

Patented Sept. 7, 1915.

Application filed March 9, 1906. Serial No. 305,050.

*To all whom it may concern:*

Be it known that I, SANDFORD C. Cox, a citizen of the United States, residing at Edison Park, in the county of Cook and State of Illinois, have invented certain new and useful Improvements in Folding and Wrapping Machines, of which the following is a full, clear, and exact specification.

This invention relates to that class of machines for folding and wrapping newspapers, and the like, in which the paper, pamphlet, or other article to be folded and wrapped, is fed into the machine in conjunction with the wrapper in which it is simultaneously folded and enveloped, and the lap of the wrapper is pasted in place; and the invention has for its primary object to provide an improved machine of this character, which will be simple in construction, and rapid and efficient in operation.

With a view to the attainment of these ends, and the accomplishment of certain other objects which will hereinafter appear, the invention consists in the features of novelty in the construction, combination and arrangement of parts, which will now be described with reference to the accompanying drawings, and then more particularly pointed out in the claims.

In said drawings Figs. 1ª, 1ᵇ and 1ᶜ are diagrammatic views of the paper and wrapper in different stages of the wrapping operation. Fig. 13, is a plan view of one of such rolls. Fig. 15, is a detail vertical section of part of the paste trough, and the fountain roller. Fig. 4, and Fig. 17, is a detail perspective view of the lower one of the folding blades.

The papers P, pamphlets, or other articles to be folded and wrapped, may be fed into this machine directly from an addressing machine, printing press, or from any other desired source by any suitable means, such for example as upper and lower tapes, 1—2, suitably related and driven to carry the paper or other article to the receiving end of the upper and lower tapes, 3—4, which carry the paper across the folding table 5, having a slot 6, through which the paper is forced, and at the same time folded by suitable means, such as the folding blade 7, arranged thereover The wrapper W in which the paper or article is wrapped is cut from a strip of paper, or other suitable material 8, which is preferably stored on a reel, or roll 9, mounted on suitable bearings 10, on frame 11 of the machine, and which strip 8 is carried upwardly, preferably to the opposite side of the machine, under an idle guide roller 12, and between a pair of feeding and cutting rollers 13—14, which are provided with cutting means, such as a toothed blade 15, and a cutting block 16, and are driven in the direction of travel of the paper, or strip 8, and are so formed and operated that they puncture the paper along a transverse line, without entirely severing it, and delivering the upper end of the strip between a pair of rollers 17—18, carrying the lower ends of belts, or tapes, 19—20 respectively, whose upper ends are carried by rollers 21—22, said tapes and rollers, 17—18, being driven at a slightly greater surface speed than the rollers 13—14, so that after the strip 8, has been thus weakened by the cutter 15, the end thereof which is in the grasp of the tapes 19—20, is pulled asunder, and fed upwardly between the roller 22, and the guide roll 23, which directs it between the upper and lower tapes 3—4, the upper tapes 3, passing around the roller 23, and the lower tapes 4 around the roller 22. With this arrangement of tapes and rollers it is also seen that should the wrapper strip 8 be deflected in such a manner as to be improperly fed, it will nevertheless be engaged by the oncoming paper, shown at P, and passed between the rollers 22, 23, thereby insuring the proper assembling of the wrapper and paper preparatory to folding. The paper and the wrapper are thus fed together across the table 5, and are struck by the blade 7, and forced downwardly in a doubled or folded form between a pair of feed rollers 24, 25, which continue the travel of the paper and the wrapper thus partially folded, into a guide or chute 26, and this directs them across the path of a horizontally operated folding blade 27, which is arranged to reciprocate in a plane on a level with the space between two rollers 28, 29, mounted to one side of the line of movement of the paper and wrapper as the same descend from the chute 26. When they arrive at a position where the paper overlaps the rollers 28—29, substantially equally, the folding blade 27 forces the paper and the wrapper between the rollers 28, 29, which rotate in opposite directions, and in a direction away from the blade 27, at their contiguous sides. The paper and wrapper arrive upon the folding table 5, in the relative position shown in Fig. 1ª; after they are struck by the folding blade 27, and forced downwardly between the rollers 24—25, they assume the position and form shown in Fig. 1ᵇ, and when the folding blade 27 engages them and forces them between the rolls 28—29, they assume the form and position shown in Fig. 1ᶜ. The rollers 28—29 act as feed rolls, and continue the travel of the paper and wrapper thus far folded and wrapped into one of a series of pockets, or clamps, 30, carried by a holder 31, in such manner that one of these clamps is always opposite the space between the rollers 28—29 when a paper is emerging therefrom. One of these rollers 28—29 also serves for supplying the wrapper W with paste. The paste is applied to the body of the wrapper at the place marked W' near the double edge of the package. The lower roll 29, is preferably employed for this purpose, a portion of the periphery of which is adapted to apply paste to the wrapper, while the remaining portion of its periphery serves as a gripping surface. The paste is applied to the pasting portion of its surface by a ductor or feed roller 32, mounted below it in a pair of arms 33, which are secured to a rocker shaft 34, and this in turn is rocked by a crank arm 35, operatively related by a rod 36, and roller 37 to a cam 38, in such a way that the roller 32 will alternately contact roll 29 and a fountain roll 39, mounted in a paste fountain or trough 40, the roll 32, being lifted by cam 38, and lowered into firm contact with roll 39, by one or more springs 41. In order that the paste which is applied to the roll 29, may be confined to certain points on the surface thereof, and prevented from finding its way over that portion of the roller's surface which comes in contact with the main body of the wrapper, such paste roll 29 is provided with longitudinal grooves 42, situated at the sides of the area which is traversed by the ductor roll 32, and these two rolls 28—29 are so related and geared and operatively connected with the balance of the machine that the portion of roll 29, bounded by the grooves 42 which is contacted by the roller 32, will be uppermost when the part w' of the wrapper is passing between rolls 28 and 29, and at all other times the wrapper contacts with only the clean or unpasted surface of the roll 29.

Figures 1, 1A, 1B, 1C:
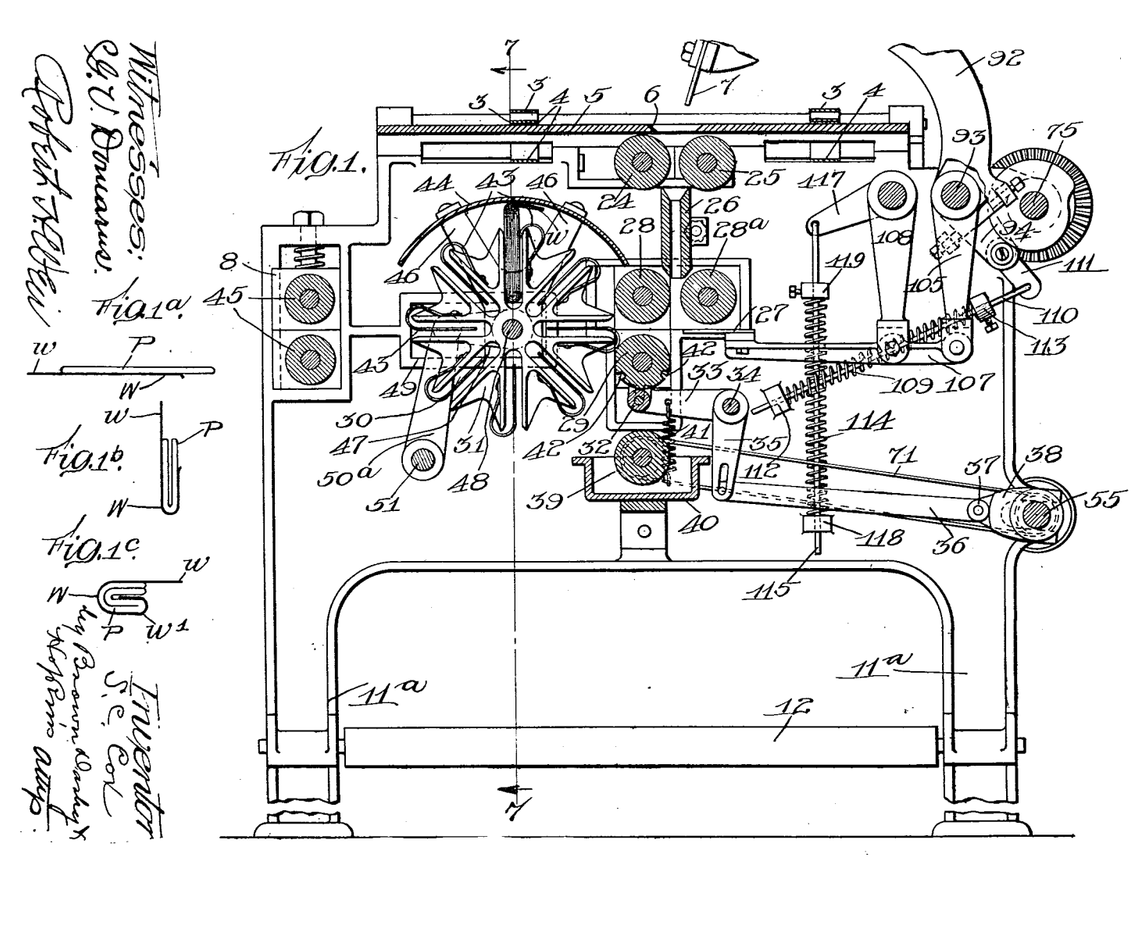
Figure 1, is a vertical longitudinal, sectional view of a folding and wrapping machine, embodying this invention, such section being taken on the line 1—1, Fig. 2.
Figure 2:
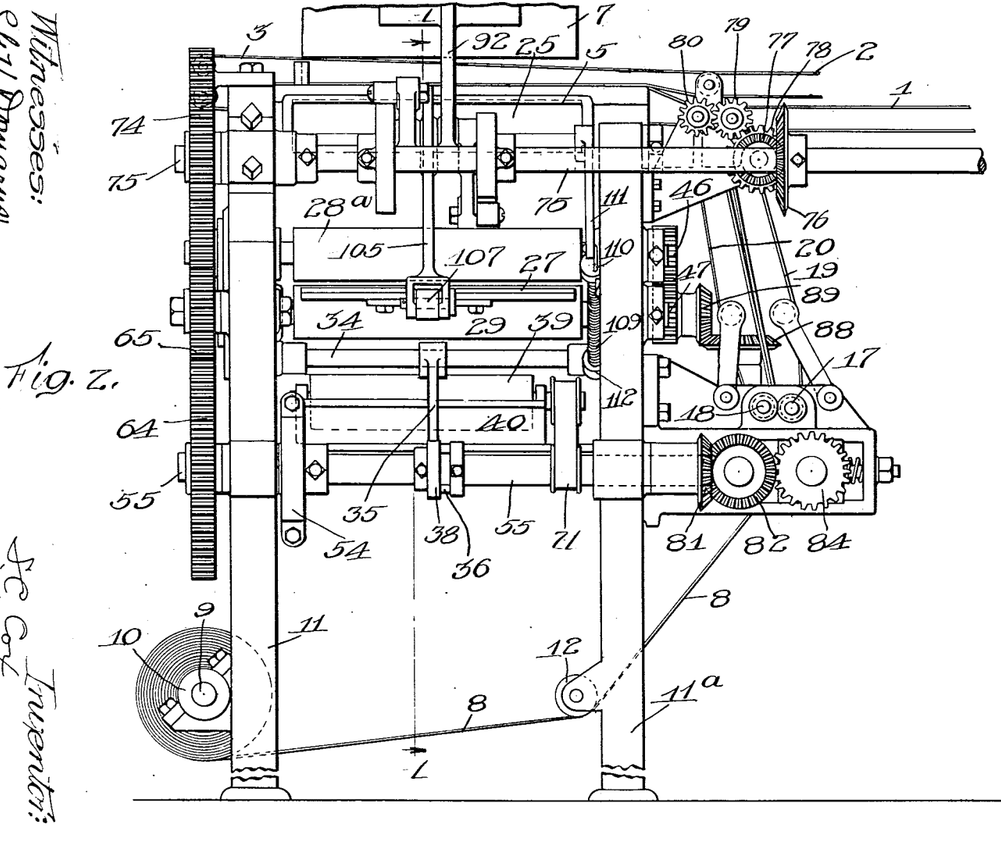
Fig. 2, is an end elevation of the machine looking from the rear end thereof.
Figure 3:
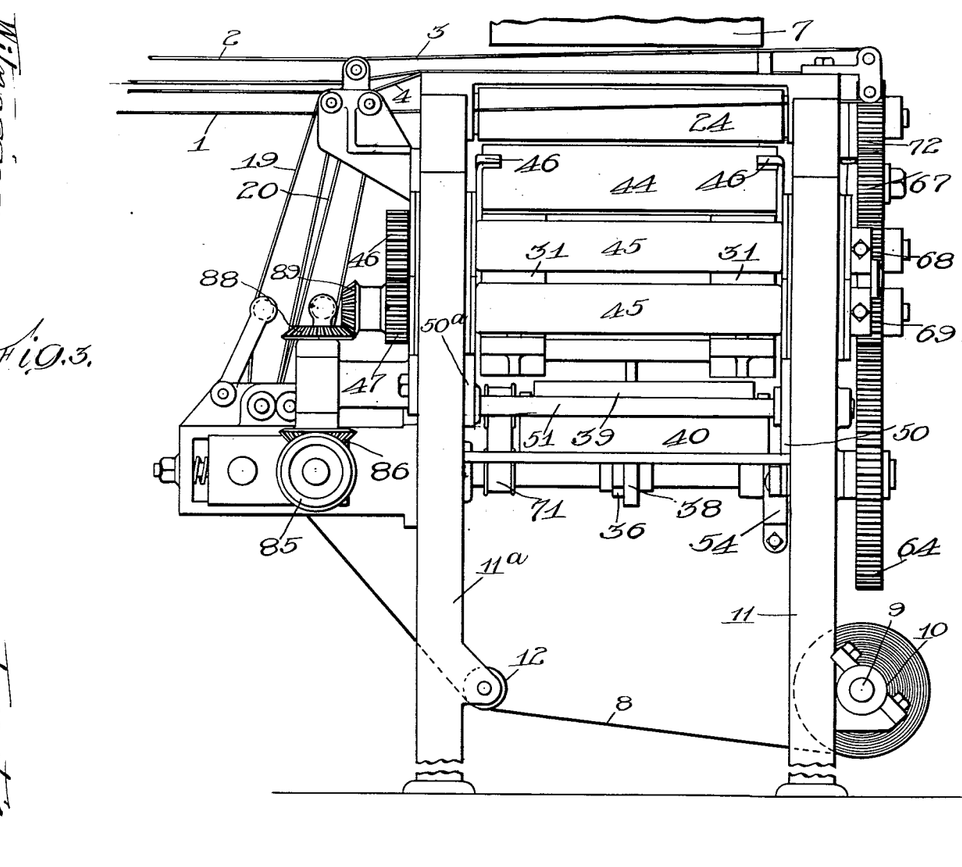
Fig. 3, is an end elevation looking from the front or discharge end.
Figure 4:
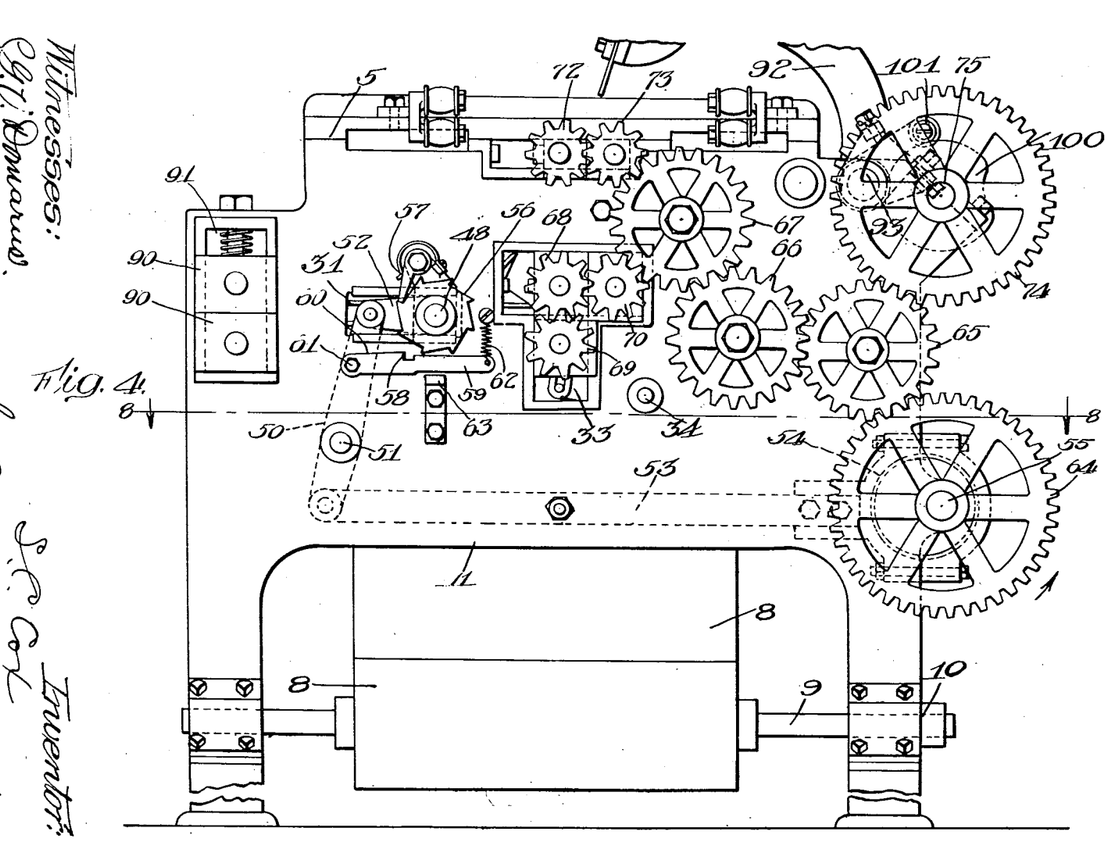
Fig. 4, is a side elevation looking from the left as viewed in Fig. 2.
Figure 5:
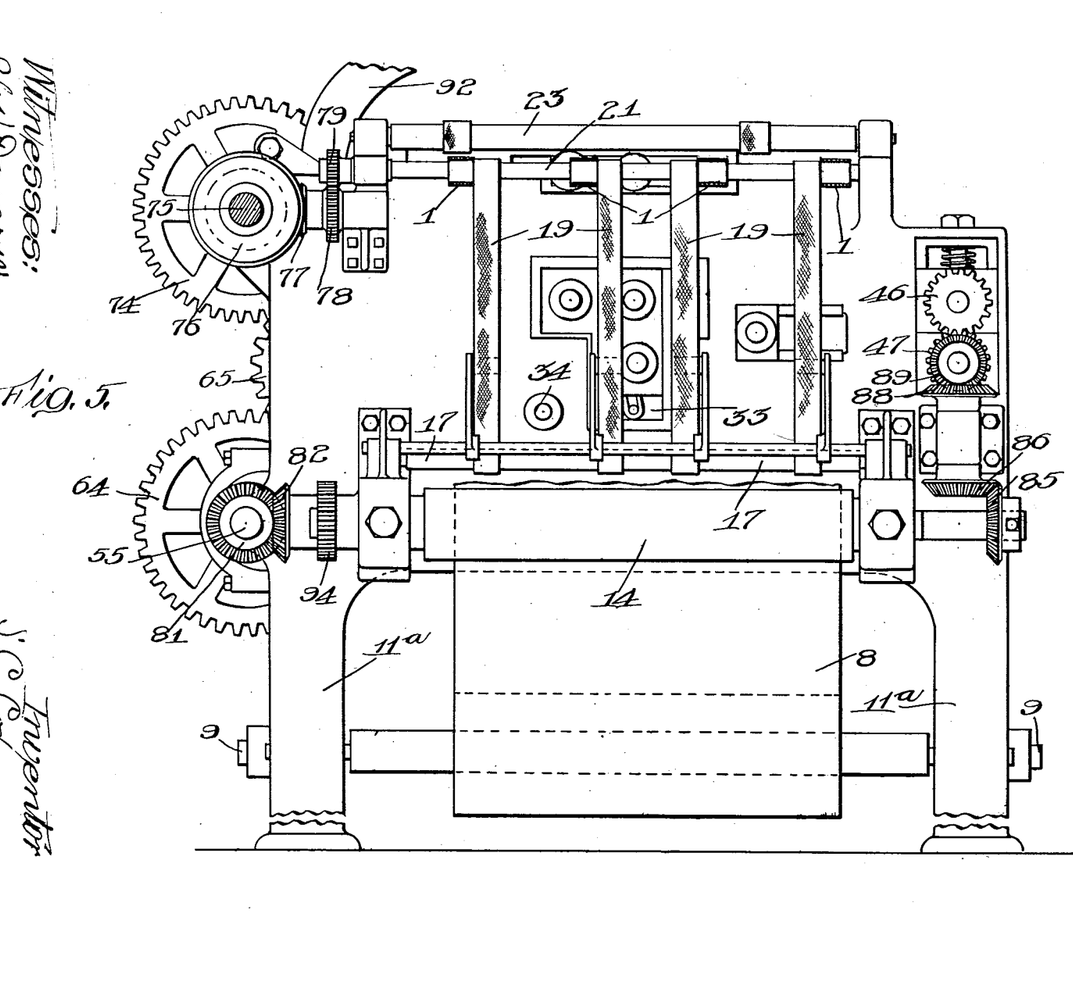
Fig. 5, is a side elevation looking from the opposite side.
Figure 6:
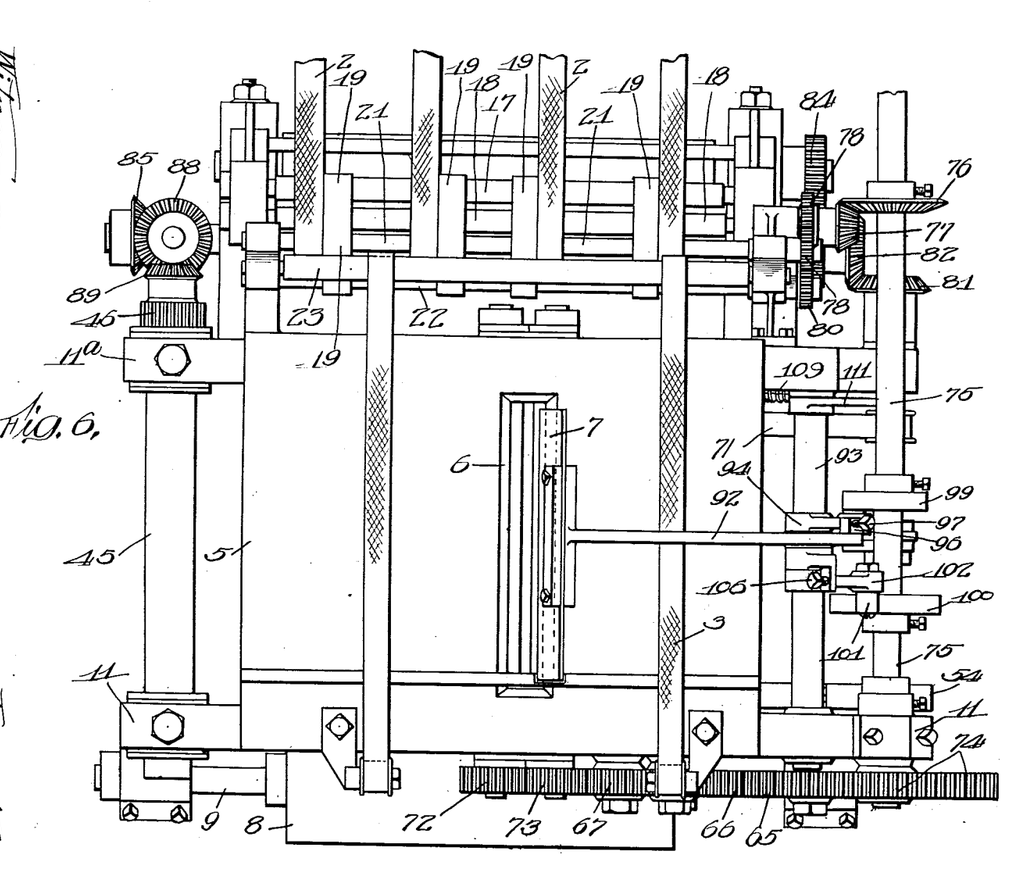
Fig. 6, is a plan view.

In order that the papers folded in the form shown in Fig. 1ᶜ may be firmly held in the pockets or clamps, regardless of their variation in thickness, it is preferable to provide these pockets with auxiliary means for taking up extra space, such as springs 43, between which and one side or wall of the pocket the paper and its wrapper is forced by the rolls 28, 29. When the pocket receives the paper and wrapper, the holder 31 is in the position shown in Fig. 1, contiguous to the feed and paste rolls 28—29; after the paper is received into the pocket, or clamp 30, the holder 31, makes a partial rotation, thereby bringing another one of the clamps, or pockets, 30 diametrically opposite receiving or ejecting rolls 45—45 which receive the protruding edge of the paper and wrapper and pull the same from the pocket or clamp 30, while at the same time pressing the flap w against the main body of the wrapper, thereby causing the paste to adhere to the flap and completely enveloping the paper. As the holder 31, rotates, the protruding end of the paper and the flap w of the wrapper are wiped against a deflector 44, which is arranged above the holder 31, concentric therewith, as better shown in Fig. 1, and serves to force the lap of the wrapper over approximately into its position against the body of the wrapper, so that when the paper arrives at a position opposite the space between rollers 45—45, the flap w will be turned backward, or toward the holder 31, thus enabling the rollers 45—45 to continue the folding movement of the flap in that direction, and finally force it down into place on the body of the wrapper. At each step of the rotation of the holder 31, the holder makes a bodily movement in a horizontal direction, or toward and from the rollers 45—45, thus alternately approaching the rollers 45—45 on one side, and the rollers 28—29 on the other side, whereby it is at one time in close proximity to the latter pair of rollers for receiving the papers, and at another time close to the rollers 45—45 for presenting the paper which is in the pocket on that side to the withdrawing and sealing action of the rollers 45.

Figure 7:
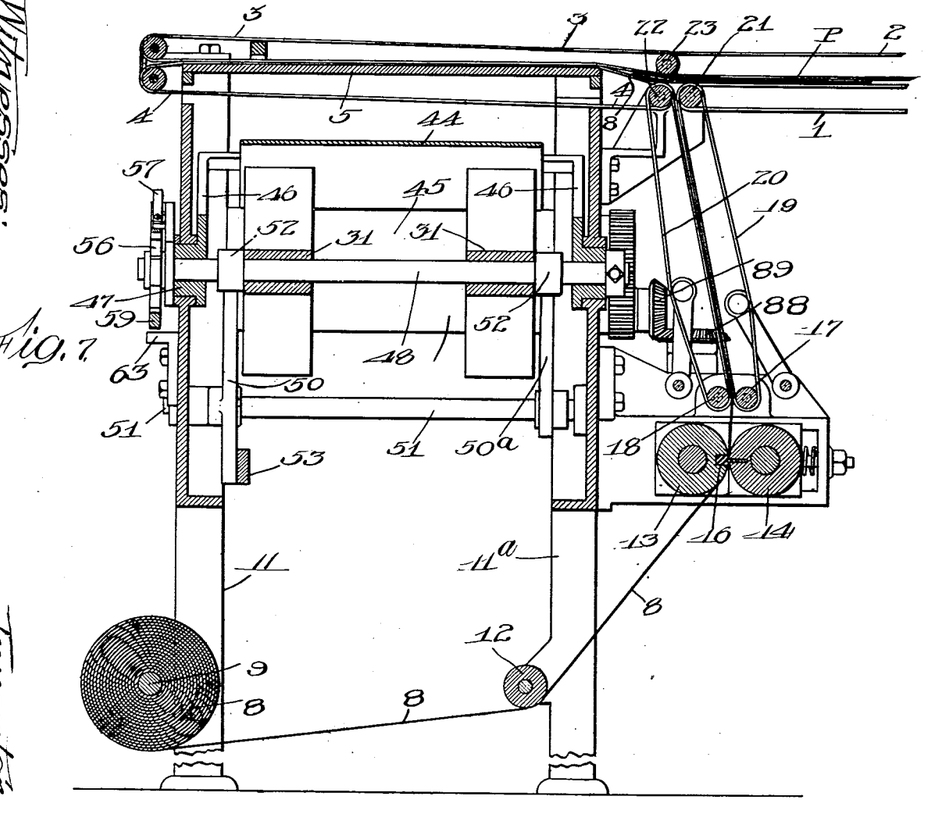
Fig. 7, is a vertical, transverse section, taken on the line 7—7, Fig. 1.
Figure 8:
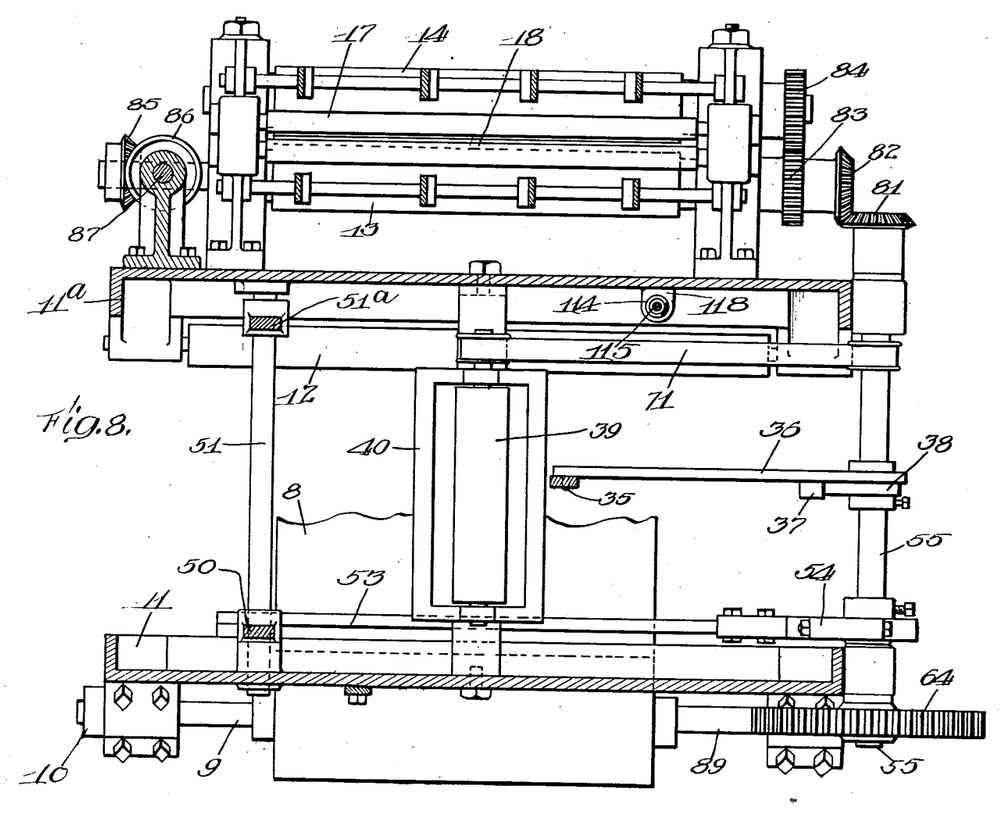
Fig. 8, is a plan section, taken on the line 8—8, Fig. 4.

In order that the deflector 44, may maintain a fixed and uniform relation to the holder 31, during both the rotary and bodily movements thereof, such deflector is preferably mounted to move bodily with the holder, and to that end is supported by two pairs of arms 46, which are mounted upon blocks 47, in which the shaft 48, of the holder 31, is journaled, said blocks being arranged to slide in horizontal guide-ways 49, formed in the side frames 11—11ª of the machine. In this exemplification of the invention the holder in which the pockets or clamps 30, are formed, is composed of this shaft 48, and two spider-like members mounted near the ends thereof at a distance apart not greater than the length of the folded paper, and both indicated by the numeral 31, as clearly shown in Fig. 7, this construction being resorted to for the sake of economizing the material which would be useless in continuing the clamps or pockets the full length of the folded paper.

The holder 31, is given the aforementioned bodily or oscillatory motion by levers 50, 50ª, secured to rocker shaft 51, journaled in the frames 11, 11ª, and having their upper ends connected by links 52, to the shaft 48, while the lower ends of lever 50 is connected to a connecting rod 53, provided with an eccentric connection 54, to shaft 55, the same shaft serving to rotate the cam 38. One end of the holder shaft 48, is provided with a ratchet wheel 56, which is held against rotation in one direction by a spring pressed dog, or pawl 57, moving with one of the boxes or blocks 47, in which shaft 48 is journaled, but as the lever 50 pulls the shaft 48 forwardly, or toward the rolls 45, one of the teeth of the ratchet 56, comes into engagement with a shoulder 58 on a bar 59, thereby causing a partial rotation of ratchet 56, and consequently of holder 31, carrying one of the clamps or pockets 30 away from rollers 28—29, and presenting another clamp or pocket to the rollers 45, as before explained. After the tooth of ratchet 56, which engages shoulder 58, passes said shoulder, the shaft 48 and the series of clamps or pockets carried thereby, are held against further rotation by two of the teeth of ratchet 56 coming into engagement simultaneously with a straight or flat surface 60, on the upper edge of bar 59, where they remain during the further forward movement of the shaft 48, and until they pass beyond the shoulder 58, in making their return movement, the bar 59 being pivoted at 61 at one end, and supported by a spring 62 at the other end, to permit the bar 59 to rise with its shoulder 58 into the line of movement of the teeth of ratchet 56, and to descend as the teeth ride upon the straight edge 60, the downward movement of bar 59 being limited, however, by a stop 63.

Shaft 55 is provided with a gear 64, which is connected by idlers 65, 66, 67, with one of the gears 68, 69, which connect the rollers 28—29 together, a gear, or pinion 70, being interposed between gears 67—68, for driving a guide roll 28ª which serves as a companion to roller 28, for guiding the paper downwardly from the chute 26. The fountain roller 39, may be driven from shaft 55, by a belt 71, and the two feed rolls 24—25 are driven in unison by pinions 72—73, one of which is driven by gear 67. The idler 65, drives a gear 74, on a shaft 75, on which is secured a beveled pinion 76, connecting with a beveled pinion 77 which drives the rolls 21—22 through the intermediary of suitable gears 78—79—80, while the rollers 13—14, are driven by a pair of beveled pinions 81—82, on the shaft 55, and the roller 13, respectively, the roller 13 being connected to the roller 14 by pinions 83—84, and the roller 13 is also connected to sealing rollers 45, by a beveled pinion 85 on roller 13, engaging a companion pinion 86, on a short vertical shaft 87, whose upper end is provided with beveled pinion 88, engaging a companion pinion 89 on the lower one of rollers 45, and the rollers 45 are connected together by gears 46—47. These rollers 45 are also preferably capable of slight relative movement, and to that end are mounted in slidable boxes 90, and are pressed toward each other by springs 91.

Figures 9, 10, 11, 12:
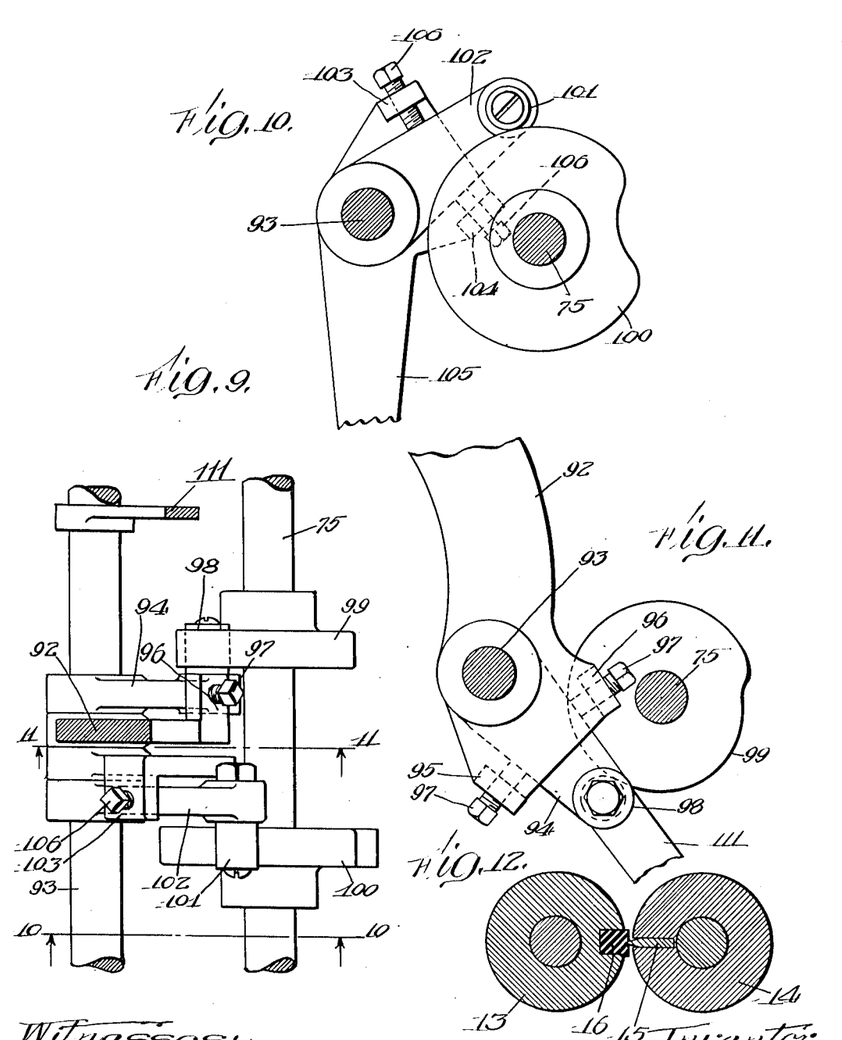
Fig. 9, is an enlarged detail plan view of the cams, and the co-acting parts for operating the folding blades.
Fig. 10, is a sectional view thereof, taken on the line 10—10, Fig. 9.
Fig. 11, is a sectional view, taken on the line 11—11, Fig. 9.
Fig. 12, is an enlarged transverse section of the wrapper cutting rolls.
Figures 13, 15, 17:
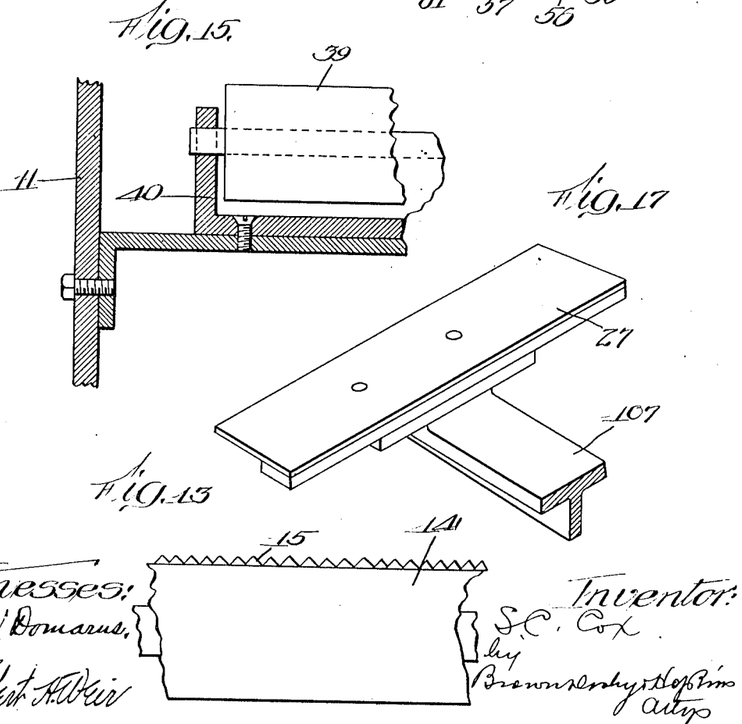
Figures 14, 16:
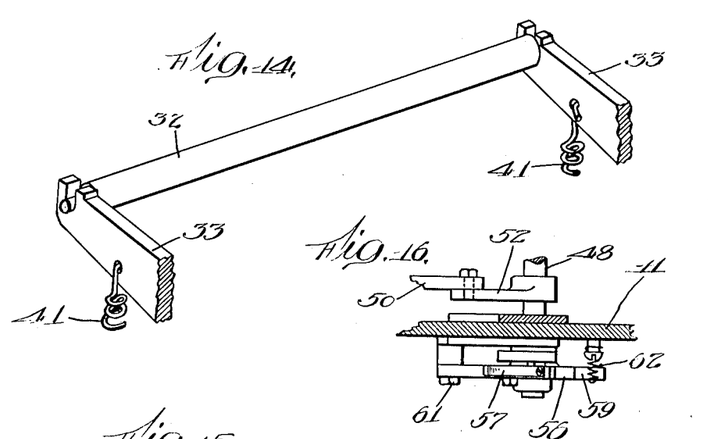
Fig. 14, is a detail perspective view of the ductor roll, and its carrying arms used in paste apparatus.
Fig. 16, is a detail plan section, taken on line 16—16.

The folding blade 7, is mounted upon an overhanging arm 92, which is supported by a shaft 93, on which it is loosely pivoted. To this shaft is rigidly secured a short crank arm 94, see Fig. 11, which lies between two lugs 95—96, on the arm 92, and through the agency of these lugs serving to oscillate arm 92, the lugs 95—96, for facilitating the adjustment of the arm 92 being preferably provided with adjusting screws 97. The arm 94, carries an anti-friction roller 98, which bears against a cam 99, mounted on shaft 75, and being so formed and timed with relation to the other mechanism of the machine as to cause the depression of the folding blade 7, when a paper and wrapper arrive thereunder, at the proper time. Also mounted upon this shaft 75, is another cam 100, against the periphery of which bears an anti-friction roller 101, upon an arm 102, which is rigidly secured to the shaft 93, and which lies between two lugs 103, 104, on the hub of the arm 105, which is also supported by shaft 93, but connected thereto only through the agency of the arm 102, and lugs 103, 104, which latter for the sake of adjustment of arm 105, carry adjusting screws 106. The arm 105, supports one end of a horizontal arm 107, which carries the folding blade 27, while this arm 107 is also supported at another point by an arm 108, which is similar in length to the arm 105, and is arranged parallel therewith, whereby the blade 27, will be retained in a horizontal position while forcing the wrapper and paper between the rollers 28—29. The roller 98 is maintained in contact with the periphery of cam 99 by any suitable means, such as a spring 109, arranged on a rod 110, which is pivoted at its upper end to crank-arm 111, on shaft 93, and has its lower end passed through a guide 112, between which and a collar 113, on rod 110 the spring 109 bears. The anti-friction roller 101 is maintained in contact with its cam 100, and the folding blade 27 moved to its retracted position by any suitable means such as a spring 114, arranged on a rod 115, whose upper end is pivoted to a crank arm 117, secured to the arm 108 in any suitable way. The lower end of spring 114 bears against a boss 118, on the frame, and through which boss the rod 115 passes, while the upper end of the spring 114 bears against a collar 119, secured to the rod 115.

What I claim is:

1. In a machine for the purpose described, the combination of a rotary transversely-oscillatory holder having a plurality of pockets or clamps for the papers and wrappers, a lap-deflector arranged contiguous to the line of movement of the lap of the wrapper while in said holder, means at one side of the holder for inserting the papers and wrappers thereinto, and means removed from the last said means for receiving the partially wrapped papers from the holder.

2. In a machine for the purpose described, the combination of a rotary and transversely-oscillatory holder having a plurality of pockets or clamps for the papers and wrappers, a lap-deflector arranged contiguous to the line of movement of the lap of the wrapper while in said holder, and being movable with said holder, means at one side of the holder for inserting the papers and wrappers thereinto, and means removed from the last said means for receiving the wrapped papers from the holder.

3. In a machine for the purpose described, the combination of a rotary and transversely-oscillatory holder having a plurality of pockets or clamps for the papers and wrappers, a lap-deflector arranged contiguous to the line of movement of the lap of the wrapper while in said holder, and being movable bodily with the holder during its said transverse movement and fixed against rotary movement therewith, means at one side of the holder for inserting the papers and wrappers thereinto, and means removed from the last said means for extracting the papers from the holder.

4. In a machine for the purpose described, the combination of a rotary and transversely oscillatory holder having a plurality of pockets or clamps for the papers and wrappers, a lap-deflector arranged contiguous to the line of movement of the flap of the wrapper while in said holder, slidable boxes in which said holder is supported, means supporting said deflector upon said boxes, means for inserting papers to and means for extracting the papers from said holder.

5. In a machine for the purpose described, the combination of a holder having a plurality of pockets for the wrappers and papers, a pair of rolls arranged contiguous to said holder, one of which is provided with grooves extending longitudinally thereof and dividing the periphery of the roll into two separate surfaces, a paste fountain means movable between said fountain and said grooved roll and adapted to contact with one of the surfaces thereof for applying paste thereto, means for forcing the paper and wrapper between said rolls and into said holder, and means for extracting the paper and wrapper from said holder and sealing the lap of the wrapper.

6. In a machine for the purpose described, the combination of folding devices, wrapper feeding tapes, rollers therefor, paper feeding tapes leading to one of said rollers at an angle to said first tapes, tapes leading from the other of said rollers at an angle to said first tapes, another set of tapes leading parallel with the last said tapes, and a roller for the last named set of tapes arranged in line with the contiguous folds of the first said tapes.

7. In a machine for the purpose described, the combination of two pairs of rolls, a rotary series of pockets situated between said pairs of rolls, a deflector partially encompassing said series of pockets, means for imparting rotary feeding action to one pair of said rolls in a direction toward the pockets, means for imparting rotary extracting action to the other pair of said rolls in a direction away from said pockets, means for moving the series of pockets bodily toward the first said pair of rolls for receiving the article to be wrapped, means for thereafter imparting intermittent rotation to said series of pockets for carrying the article away from the first said pair of rolls and engaging the wrapper against said deflector, and means for moving the pockets bodily toward the second pair of rolls for introducing an article, in another of said pockets, between the latter said rolls.

In testimony whereof I have signed my name to this specification, in the presence of two subscribing witnesses, on this 6th day of March A. D. 1906.

SANDFORD C. COX.

Witnesses:
FRANCIS A. HOPKINS,
CHAS. H. SEEM.